Patented Sept. 10, 1946

2,407,351

UNITED STATES PATENT OFFICE 2,407,351

PROCESS FOR THE MANUFACTURE OF o-SULPHOBENZOIC ACIDS

Walter Stammbach, Basel, Switzerland, assignor to the firm J. R. Geigy A. G., Basel, Switzerland No Drawing. Application June 11, 1943, Serial No. 490,535

3 Claims. (Cl. 260—507)

It has been found that o-halogen benzoic acids and their substitution compounds as well as derivatives thereof with a modified carboxylic group may be converted into o-sulphobenzoic acids by means of salts of sulphurous acid in the presence of copper or copper salts.

The present invention may be illustrated, but not limited by the following example, wherein the parts are by weight, unless otherwise stated.

Example 14 parts of o-chlorobenzoic acid are dissolved in an autoclave (capacity 50 parts of volume) in 14 parts of water by means of 12 parts of 30% caustic soda or potash or of any other base yielding soluble salts (reaction very weakly alkaline to litmus). This mixture is treated with 13 parts of 94% sodium sulphite or with a corresponding quantity of another sulphite, e. g. potassium or magnesium salt, and with 0.135 part of copper sulphate dissolved in 0.4 part of water. Then the autoclave is heated to 170°–175° C. within 4 hours and the whole stirred for 10 hours at this temperature. After cooling the white pasty mass is introduced into a pot, then 15 parts of hot water are added thereto and the whole is heated to about 70°–80° C. By adding 13 parts of 30% hydrochloric acid the mixture it made distinctly acid to Congo and stirred for some time at 80° C. Now, the solution is concentrated by evaporation; during this operation the inorganic salts which are first separated may be filtered off. If some unchanged chlorobenzoic acid precipitates out, it will be advisable to filter the mixture before the evaporation to dryness.

Likewise it is also possible to evaporate the solution made neutral to litmus.

The final product is obtained in form of colorless powder which is easily soluble in water. The yield is very good.

Instead of copper sulphate, another copper salt or even metallic copper, e. g. copper powder, may also be used. Moreover, it is also possible to carry out the reaction in a copper vessel.

The o-bromobenzoic acid reacts in exactly the same manner.

What I claim is:

1. The method of converting a compound selected from the group consisting of neutralised o-chlorobenzoic acid and o-bromobenzoic acid into o-sulphobenzoic acid, which comprises heating a member of the said group in aqueous medium with an inorganic sulphite in the presence of a catalyst selected from the group consisting of copper and copper salts.

2. The method of converting neutralised o-chlorobenzoic acid into o-sulphobenzoic acid, which comprises heating the said neutralised o-chlorobenzoic in aqueous medium with an inorganic sulphite in the presence of a catalyst selected from the group consisting of copper and copper salts.

3. The method of converting neutralised o-bromobenzoic acid into o-sulphobenzoic acid, which comprises heating the said neutralised o-bromobenzoic in aqueous medium with an inorganic sulphite in the presence of a catalyst selected from the group consisting of copper and copper salts.

WALTER STAMMBACH.